United States Patent
Asai et al.

(10) Patent No.: US 9,960,440 B2
(45) Date of Patent: May 1, 2018

(54) FUEL CELL SYSTEM AND CONTROL METHOD FOR FUEL CELL SYSTEM

(71) Applicant: NISSAN MOTOR CO., LTD., Yokohama-shi, Kanagawa (JP)

(72) Inventors: Yoshitomo Asai, Kanagawa (JP); Yousuke Tomita, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 258 days.

(21) Appl. No.: 14/911,543

(22) PCT Filed: Jul. 16, 2014

(86) PCT No.: PCT/JP2014/068885
§ 371 (c)(1),
(2) Date: Feb. 11, 2016

(87) PCT Pub. No.: WO2015/022836
PCT Pub. Date: Feb. 19, 2015

(65) Prior Publication Data
US 2016/0190618 A1    Jun. 30, 2016

(30) Foreign Application Priority Data
Aug. 12, 2013 (JP) .................. 2013-167264

(51) Int. Cl.
*H01M 8/04* (2016.01)
*H01M 8/04746* (2016.01)
(Continued)

(52) U.S. Cl.
CPC ..... *H01M 8/04776* (2013.01); *H01M 8/0444* (2013.01); *H01M 8/04231* (2013.01);
(Continued)

(58) Field of Classification Search
CPC ......... H01M 8/04776; H01M 8/04231; H01M 8/04388; H01M 8/04753
See application file for complete search history.

(56) References Cited

U.S. PATENT DOCUMENTS 3,915,747 A * 10/1975 Summers .................. C01B 3/24
429/416
7,641,993 B2 * 1/2010 Arthur .............. H01M 8/04097
429/409

(Continued)

FOREIGN PATENT DOCUMENTS

EP       2 453 507 A1    5/2012
JP       2012-156144 A   8/2012

*Primary Examiner* — Matthew J Merkling
(74) *Attorney, Agent, or Firm* — Foley & Lardner LLP

(57) ABSTRACT

A fuel cell system includes a compressor for supplying the cathode gas to the fuel cell, an anode gas discharge system for discharging anode off-gas discharged from the fuel cell into a cathode gas flow passage, a pulsating operation control unit for causing a pressure of the anode gas to pulsate based on an operating state of the fuel cell, a purge control unit for purging the anode off-gas into the cathode gas flow passage based on an impurity concentration of an anode of the fuel cell and a pressure of the anode, and a compressor control unit for controlling the compressor based on a purge flow rate controlled by the purge control unit, and the purge control unit for setting the pressure of the anode to a predetermined value determined according to a pulsating state of the anode gas.

9 Claims, 10 Drawing Sheets

(51) Int. Cl.
*H01M 8/04223* (2016.01)
*H01M 8/0444* (2016.01)
*H01M 8/0438* (2016.01)

(52) U.S. Cl.
CPC ... *H01M 8/04388* (2013.01); *H01M 8/04753* (2013.01); *H01M 8/04761* (2013.01); *H01M 2250/20* (2013.01); *Y02T 90/32* (2013.01)

(56) References Cited

U.S. PATENT DOCUMENTS

| | | | |
|---|---|---|---|
| 7,851,099 B2 * | 12/2010 | Ojima | H01M 8/04097 429/442 |
| 2009/0044994 A1 * | 2/2009 | Brighton, II | B60L 11/005 180/65.31 |
| 2009/0269628 A1 * | 10/2009 | Imanishi | H01M 8/04089 429/421 |
| 2012/0107711 A1 * | 5/2012 | Tomita | H01M 8/04388 429/446 |
| 2015/0044582 A1 * | 2/2015 | Chikugo | H01M 8/04089 429/411 |

* cited by examiner

FUEL CELL SYSTEM AND CONTROL METHOD FOR FUEL CELL SYSTEM

TECHNICAL FIELD

The present invention relates to a fuel cell system and a control method for fuel cell system.

BACKGROUND ART

JP2012-156144A discloses a conventional fuel cell system in which a hydrogen concentration of exhaust gas discharged out of the fuel cell system is reduced to or below a predetermined concentration by cathode gas.

SUMMARY OF INVENTION

In fuel cell systems currently under development, anode off-gas enters a cathode gas discharge passage via a purge valve. By controlling a cathode gas supply flow rate of a compressor based on a flow rate of the anode off-gas discharged to the cathode gas discharge passage (purge flow rate), a hydrogen concentration of exhaust gas discharged out of the fuel cell system through the cathode gas discharge passage is finally reduced to or below a predetermined concentration.

The purge flow rate depends on an opening of the purge valve and a differential pressure before and after the purge valve (=differential pressure between a pressure of anode gas and an atmospheric pressure). Thus, in the case of performing a pulsating operation of pulsating the pressure of the anode gas, the differential pressure between upstream and downstream of the purge valve pulsates according to the pulsation of the pressure of the anode gas, whereby the purge flow rate pulsates (increases and decreases).

As a result, the cathode gas supply flow rate of the compressor controlled based on the purge flow rate may pulsate and abnormal noise such as beat noise may be generated from the compressor.

The present invention was developed in view of such a problem and aims to suppress the generation of abnormal noise from a compressor.

According to one aspect of the present invention, a fuel cell system for generating power by supplying anode gas and cathode gas to a fuel cell is provided. The fuel cell system includes a compressor for supplying the cathode gas to the fuel cell, an anode gas discharge system for discharging anode off-gas discharged from the fuel cell into a cathode gas flow passage, a pulsating operation control unit for causing a pressure of the anode gas to pulsate based on an operating state of the fuel cell, a purge control unit for purging the anode off-gas into the cathode gas flow passage based on an impurity concentration of an anode of the fuel cell and a pressure of the anode, and a compressor control unit for controlling the compressor based on a purge flow rate controlled by the purge control unit. The purge control unit for setting the pressure of the anode to a predetermined value determined according to a pulsating state of the anode gas.

DESCRIPTION OF EMBODIMENT

Hereinafter, one embodiment of the present invention is described with reference to the drawings.

In a fuel cell, an electrolyte membrane is sandwiched by an anode electrode (fuel electrode) and a cathode electrode (oxidant electrode) and power is generated by supplying anode gas (fuel gas) containing hydrogen to the anode electrode and cathode gas (oxidant gas) containing oxygen to the cathode electrode. Electrode reactions which proceed in both anode and cathode electrodes are as follows.

$$\text{Anode electrode: } 2H_2 \rightarrow 4H^+ + 4e^- \quad (1)$$

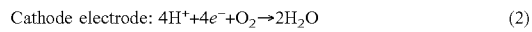

$$\text{Cathode electrode: } 4H^+ + 4e^- + O_2 \rightarrow 2H_2O \quad (2)$$

The fuel cell generates an electromotive force of about 1 volt by the above electrode reactions (1) and (2).

In the case of using a fuel cell as a power source for an automotive vehicle, a fuel cell stack in which several hundreds of fuel cells are laminated is used since required power is large. By configuring a fuel cell system for supplying the anode gas and the cathode gas to the fuel cell stack, power for driving a vehicle is taken out.

Figure 1:
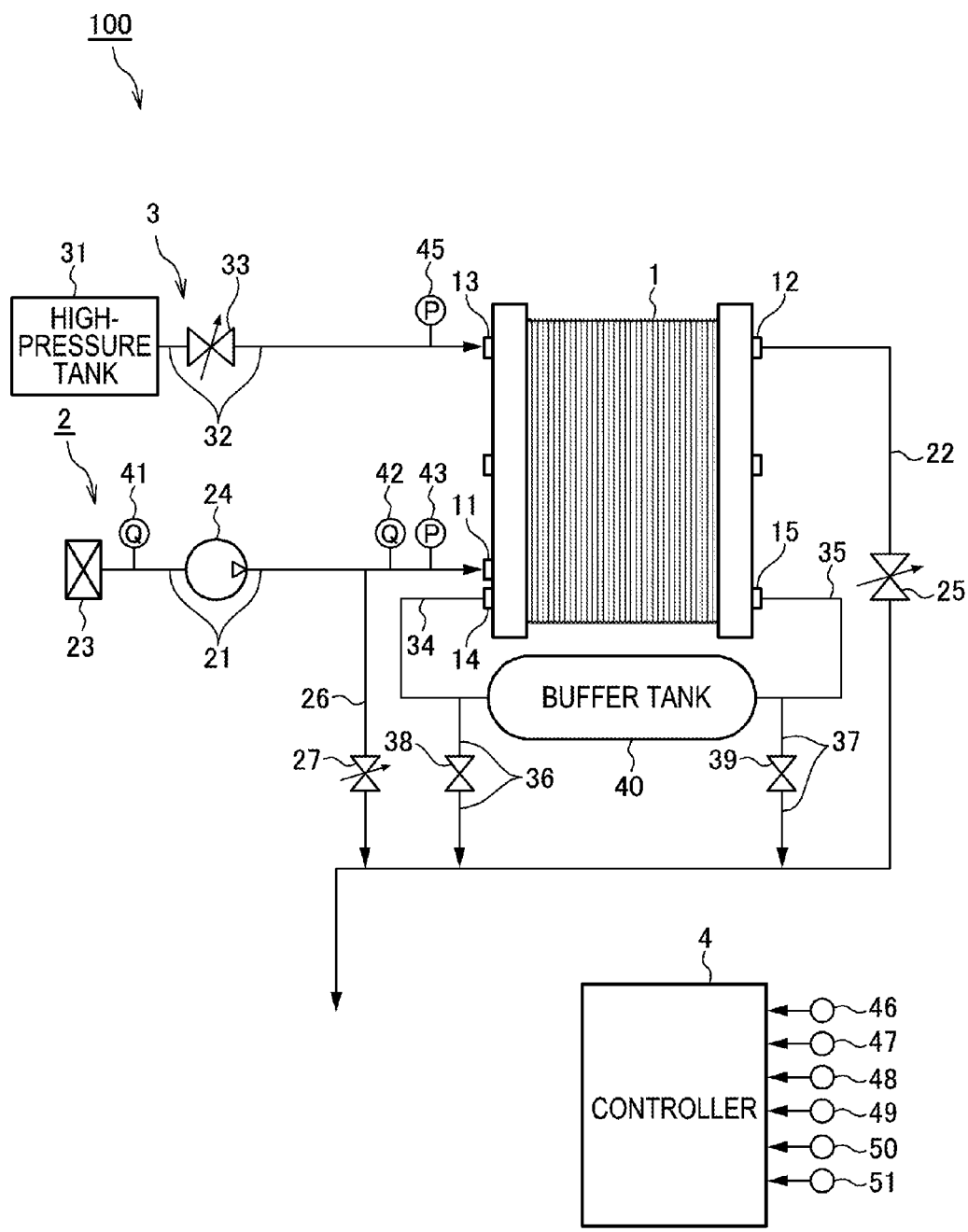
FIG. 1 is a schematic diagram of a fuel cell system according to one embodiment of the present invention.

FIG. 1 is a schematic diagram of a fuel cell system 100 according to the one embodiment of the present invention.

The fuel cell system 100 includes a fuel cell stack 1, a cathode gas supplying/discharging device 2, an anode gas supplying/discharging device 3 and a controller 4. A cooling system for cooling the fuel cell stack 1 is not shown to prevent complexity.

The fuel cell stack 1 is formed by laminating several hundreds of fuel cells and generates power necessary to drive a vehicle upon receiving the supply of the anode gas and the cathode gas.

The cathode gas supplying/discharging device 2 supplies cathode gas (air) to the fuel cell stack 1 and discharges cathode off-gas discharged from the fuel cell stack 1 to outside air. The cathode gas supplying/discharging device 2 includes a cathode gas supply passage 21, a cathode gas discharge passage 22, a filter 23, a cathode compressor 24, a cathode pressure regulating valve 25, a bypass passage 26, a bypass valve 27, a first air flow sensor 41, a second air flow sensor 42 and a cathode pressure sensor 43.

The cathode gas supply passage 21 is a passage in which the cathode gas to be supplied to the fuel cell stack 1 flows. One end of the cathode gas supply passage 21 is connected to the filter 23 and the other end is connected to a cathode gas inlet hole 11 of the fuel cell stack 1.

The cathode gas discharge passage 22 is a passage in which the cathode off-gas discharged from the fuel cell stack 1 flows. One end of the cathode gas discharge passage 22 is connected to a cathode gas outlet hole 12 of the fuel cell stack 1 and the other end serves as an opening end. The cathode off-gas is mixture gas of oxygen not used in the electrode reaction, nitrogen contained in the cathode gas, stream generated by the electrode reaction and the like.

The filter 23 removes foreign substances in the cathode gas to be taken into the cathode gas supply passage 21.

The cathode compressor 24 is provided in the cathode gas supply passage 21. The cathode compressor 24 takes air as the cathode gas into the cathode gas supply passage 21 via the filter 23 and supplies it to the fuel cell stack 1.

The cathode pressure regulating valve 25 is provided in the cathode gas discharge passage 22. The cathode pressure regulating valve 25 is controlled to be opened and closed by the controller 4 and regulates a pressure of the cathode gas to be supplied to the fuel cell stack 1 to a desired pressure. It should be noted that a throttle such as an orifice may be provided without providing the cathode pressure regulating valve 25.

The bypass passage 26 is a passage provided to enable part of the cathode gas ejected from the cathode compressor 24 to be directly discharged to the cathode gas discharge passage 22 without by way of the fuel cell stack 1 if necessary. One end of the bypass passage 26 is connected to a part of the cathode gas supply passage 21 downstream of the cathode compressor 24 and the other end is connected to a part of the cathode gas discharge passage 22 downstream of the cathode pressure regulating valve 25.

The bypass valve 27 is provided in the bypass passage 26. The bypass valve 27 is controlled to be opened and closed by the controller 4 to regulate a flow rate of the cathode gas flowing in the bypass passage 26 (hereinafter, referred to as a "bypass flow rate").

The first air flow sensor 41 is provided upstream of the cathode compressor 24 in the cathode gas supply passage 21. The first air flow sensor 41 detects a flow rate of the cathode gas to be supplied to the cathode compressor 24 (hereinafter, referred to as a "compressor supply flow rate").

The second air flow sensor 42 is provided downstream of a connected part to the bypass passage 26 in the cathode gas supply passage 21. The second air flow sensor 42 detects a flow rate of the cathode gas to be supplied to the fuel cell stack 1 out of the cathode gas discharged from the cathode compressor 24 (hereinafter, referred to as a "stack supply flow rate"). The stack supply flow rate is a flow rate obtained by subtracting the bypass flow rate from the compressor supply flow rate.

The cathode pressure sensor 43 is provided near the cathode gas inlet hole 11 in the cathode gas supply passage 21. The cathode pressure sensor 43 detects a pressure of the cathode gas to be supplied to the fuel cell stack 1 (hereinafter, referred to as a "cathode pressure").

The anode gas supplying/discharging device 3 supplies anode gas to the fuel cell stack 1 and discharges anode off-gas discharged from the fuel cell stack 1 to the cathode gas discharge passage 22. The anode gas supplying/discharging device 3 includes a high-pressure tank 31, an anode gas supply passage 32, an anode pressure regulating valve 33, a first anode gas discharge passage 34, a second anode gas discharge passage 35, a first purge passage 36, a second purge passage 37, a first purge valve 38, a second purge valve 39, a buffer tank 40 and an anode pressure sensor 45.

The high-pressure tank 31 stores the anode gas (hydrogen) to be supplied to the fuel cell stack 1 in a high-pressure state.

The anode gas supply passage 32 is a passage for supplying the anode gas discharged from the high-pressure tank 31 to the fuel cell stack 1. One end of the anode gas supply passage 32 is connected to the high-pressure tank 31 and the other end is connected to an anode gas inlet hole 13 of the fuel cell stack 1.

The anode pressure regulating valve 33 is provided in the anode gas supply passage 32. The anode pressure regulating valve 33 is controlled to be opened and closed by the controller 4 and regulates a pressure of the anode gas to be supplied to the fuel cell stack 1 to a desired pressure.

The anode pressure sensor 45 is provided downstream of the anode pressure regulating valve 33 in the anode gas supply passage 32 and detects the pressure of the anode gas to be supplied to the fuel cell stack 1 (hereinafter, referred to as an "anode pressure").

One end part of the first anode gas discharge passage 34 is connected to a first anode gas outlet hole 14 of the fuel cell stack 1 and the other end part is connected to the buffer tank 40. Mixture gas of surplus anode gas not used in the electrode reaction and inert gas containing nitrogen and moisture (generated water and steam) having permeated from a cathode electrode side to an anode electrode side (hereinafter, referred to as "anode off-gas") is discharged to the first anode gas discharge passage 34.

One end part of the second anode gas discharge passage 35 is connected to a second anode gas outlet hole 15 of the fuel cell stack 1 and the other end part is connected to the buffer tank 40. The anode off-gas is discharged to the second anode gas discharge passage 35.

The buffer tank 40 temporarily stores the anode off-gas having flowed through the first and second anode gas discharge passages 34, 35. The anode off-gas pooled in the buffer tank 40 is discharged to the cathode gas discharge passage 22 through the first and second purge passages 36, 37 when the first and second purge valves 38, 39 are open.

One end part of the first purge passage 36 is connected to the first anode gas discharge passage 34 and the other end part is connected to the cathode gas discharge passage 22.

One end part of the second purge passage 37 is connected to the second anode gas discharge passage 35 and the other end part is connected to the cathode gas discharge passage 22. It should be noted that the other end parts of the first and second purge passages 36, 37 may be connected to the cathode gas supply passage 21. Specifically, the other end parts of the first and second purge passages 36, 37 have only to be connected to a cathode gas flow passage (cathode gas supply passage 21 and cathode gas discharge passage 22).

The first purge valve 38 is an electromagnetic valve provided in the first purge passage 36 and capable of regulating an opening to be fully open or fully closed, and controlled by the controller 4. The first purge valve 38 regulates a flow rate of the anode off-gas discharged from the first anode gas discharge passage 34 to the cathode gas discharge passage 22. A water jacket (not shown) for preventing fixing caused by freezing is formed in the first purge valve 38 and cooling water for cooling the fuel cell stack 1 is circulated therein. In the present embodiment, a temperature of the cooling water introduced into the water jacket of this first purge valve 38 is detected and used as a temperature of the first purge valve 38 (hereinafter, referred to as a "first purge valve temperature").

The second purge valve 39 is an electromagnetic valve provided in the second purge passage 37 and capable of regulating an opening to be fully open or fully closed, and controlled by the controller 4. The second purge valve 39 regulates a flow rate of the anode off-gas discharged from the second anode gas discharge passage 35 to the cathode gas discharge passage 22. A water jacket (not shown) is formed also in the second purge valve 39 and the cooling water for cooling the fuel cell stack 1 is circulated therein. In the present embodiment, a temperature of the cooling water introduced into the water jacket of this second purge valve 39 is detected and used as a temperature of the second purge valve 39 (hereinafter, referred to as a "second purge valve temperature").

The controller 4 is configured by a microcomputer including a central processing unit (CPU), a read-only memory (ROM), a random access memory (RAM) and an input/output interface (I/O interface).

To the controller 4 are input signals from various sensors for detecting an operating state of the fuel cell system 100 such as a current sensor 46 for detecting a current taken out from the fuel cell stack 1 (output current), a voltage sensor 47 for detecting an output voltage of the fuel cell stack 1, an accelerator stroke sensor 48 for detecting a depressed amount of an accelerator pedal (hereinafter, referred to as an "accelerator operation amount"), an SOS sensor 49 for detecting a battery charged amount, an atmospheric pressure sensor 50 for detecting an atmospheric pressure and a water temperature sensor 51 for detecting a temperature of the cooling water discharged from the fuel cell stack (hereinafter, referred to as a "stack temperature") besides the aforementioned first air flow sensor 41 and the like.

On the basis of these input signals, the controller 4 controls the supply of the anode gas and the cathode gas to the fuel cell stack 1 and controls the opening and closing of the first and second purge valves 38, 39. An open/close control of the first and second purge valves 38, 39 is described below after an anode gas supply control is described, and a cathode gas supply control is finally described.

Figure 2:
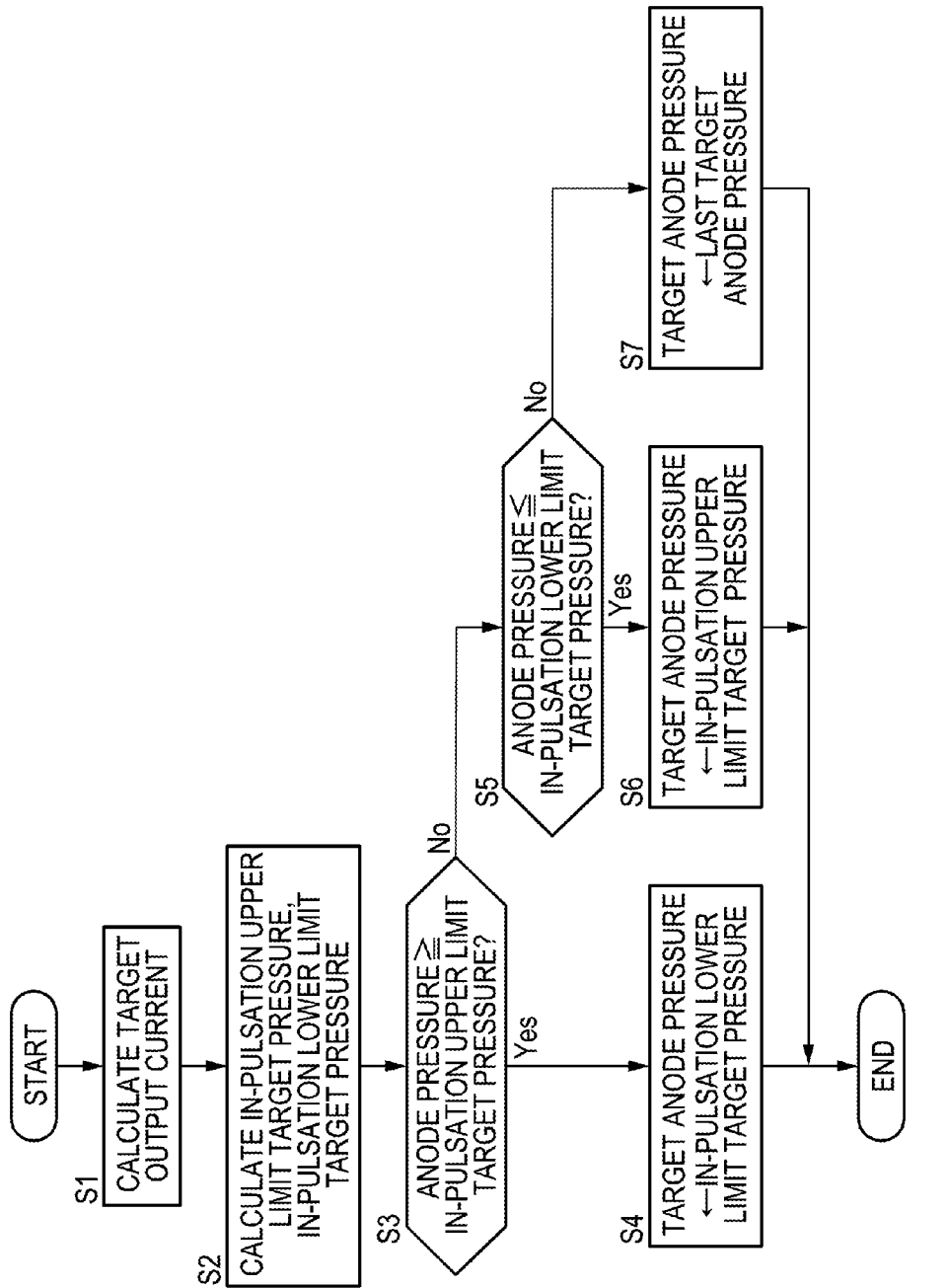
FIG. 2 is a flow chart showing an anode gas supply control according to the one embodiment of the present invention.

FIG. 2 is a flow chart showing the anode gas supply control according to the present embodiment. In the present embodiment, the supply of the anode gas to the fuel cell stack 1 is so controlled that the anode pressure pulsates.

In Step S1, the controller 4 calculates a target output current of the fuel cell stack 1 based on the operating state of the fuel cell system 100. Specifically, the controller 4 calculates target output power of the fuel cell stack 1 based on power required by a drive motor (not shown) for generating a drive force of the vehicle and auxiliary machines such as the cathode compressor 24 and a charge/discharge request of a battery, and calculates the target output current from an IV characteristic of the fuel cell stack 1 based on the target output power.

Figure 3:
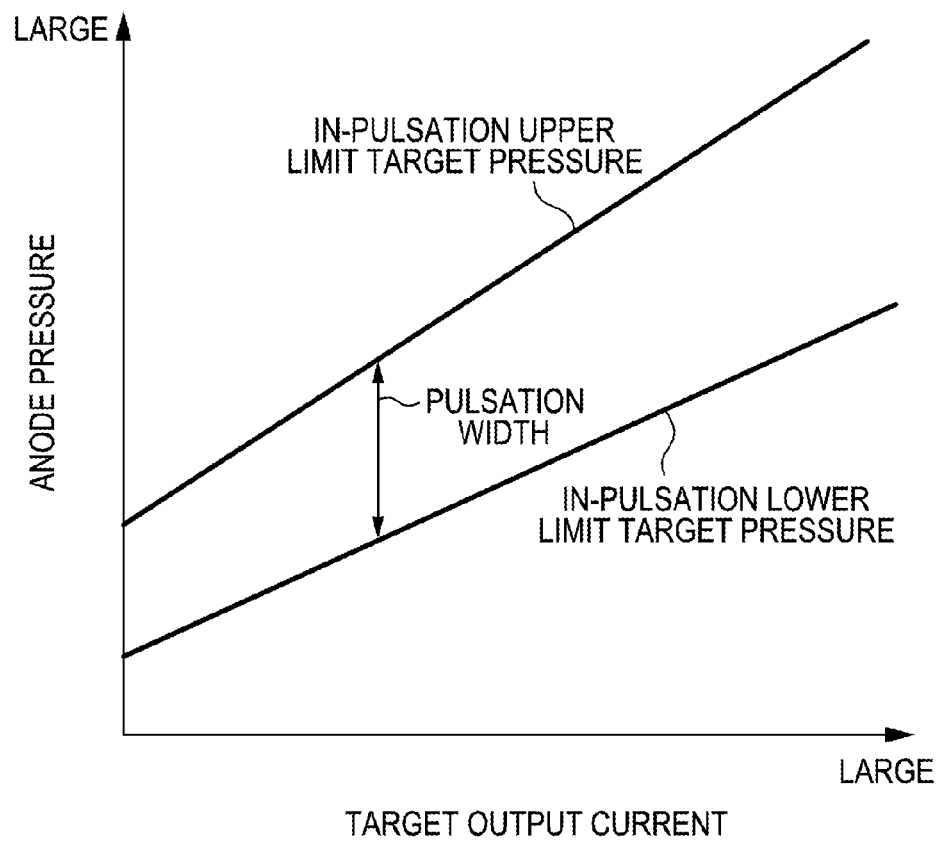
FIG. 3 is a table for calculating an in-pulsation upper limit target pressure and an in-pulsation lower limit target pressure based on a target output current.

In Step S2, the controller 4 refers to a table of FIG. 3 and calculates an in-pulsation upper limit target pressure and an in-pulsation lower limit target pressure based on the target output current. As shown in the table of FIG. 3, the in-pulsation upper limit target pressure and the in-pulsation lower limit target pressure are respectively larger when the target output current is high than when it is low. Further, a pulsation width is similarly larger when the target output current is high than when it is low.

In Step S3, the controller 4 determines whether or not the anode pressure is higher than the in-pulsation upper limit target pressure. The controller 4 performs a processing of Step S4 to reduce the anode pressure if the anode pressure is not lower than the in-pulsation upper limit target pressure.

On the other hand, a processing of Step S5 is performed if the anode pressure is lower than the in-pulsation upper limit target pressure.

In Step S4, the controller 4 sets a target anode pressure to the in-pulsation lower limit target pressure. In this way, an opening of the anode pressure regulating valve 33 is feedback-controlled so that the anode pressure reaches the in-pulsation lower limit target pressure. As a result of this feedback control, the opening of the anode pressure regulating valve 33 is normally fully closed and the supply of the anode gas from the high-pressure tank 31 to the fuel cell stack 1 is stopped. As a result, the anode pressure decreases due to the consumption of the anode gas in the fuel cell stack 1 caused by power generation.

In Step S5, the controller 4 determines whether or not the anode pressure is not higher than the in-pulsation lower limit target pressure. The controller 4 performs a processing of Step S6 to increase the anode pressure if the anode pressure is not higher than the in-pulsation lower limit target pressure. On the other hand, a processing of Step S7 is performed if the anode pressure is higher than the in-pulsation lower limit target pressure.

In Step S6, the controller 4 sets the target anode pressure to the in-pulsation upper limit target pressure. In this way, the opening of the anode pressure regulating valve 33 is feedback-controlled so that the anode pressure reaches the in-pulsation upper limit target pressure. As a result of this feedback control, the opening of the anode pressure regulating valve 33 is opened to a desired opening and the anode gas is supplied from the high-pressure tank 31 to the fuel cell stack 1 to increase the anode pressure.

In Step S7, the controller 4 sets the target anode pressure to the same target anode pressure as the last time.

Figure 4:
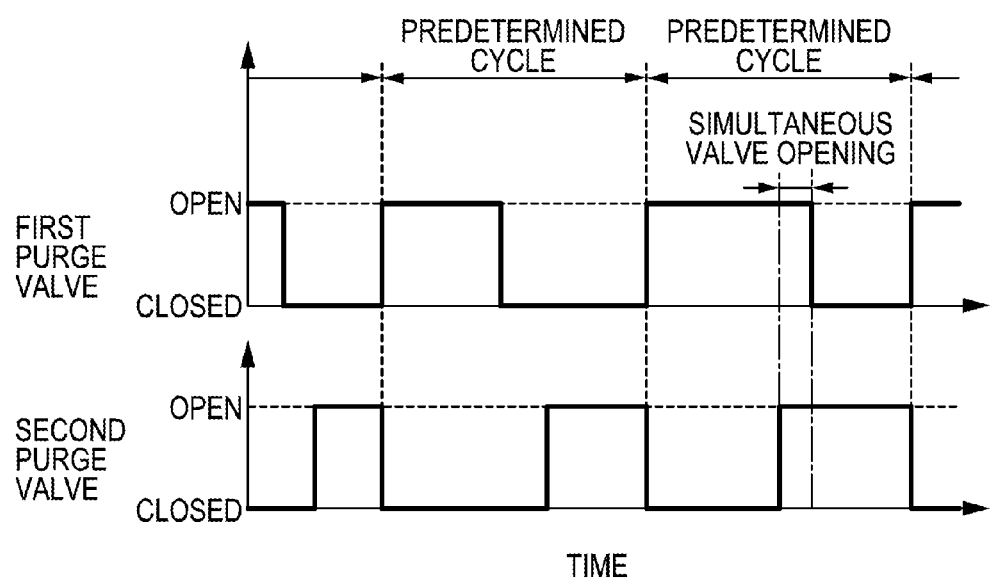
FIG. 4 is a chart showing an open/close control of a first purge valve and a second purge valve according to the one embodiment of the present invention.

FIG. 4 is a chart showing the open/close control of the first and second purge valves 38, 39 according to the present embodiment.

The anode off-gas discharged to the first and second anode gas discharge passages 34, 35 contains impurities such as nitrogen and moisture having permeated from the cathode electrode side to the anode electrode side. Thus, if the first and second purge valves 38, 39 are kept closed, nitrogen and moisture may be accumulated in the buffer tank 40 to reduce a hydrogen concentration of the entire anode system and the hydrogen concentration necessary for power generation may not be ensured.

Accordingly, in the present embodiment, the first and second purge valves 38, 39 are controlled to be opened and closed so that impurities such as nitrogen and moisture having permeated to the anode electrode side are discharged from the anode system, thereby regulating a total flow rate of the anode off-gas discharged to the cathode gas discharge passage 22 (hereinafter, referred to as a "purge flow rate").

Specifically, as shown in FIG. 4, the first and second purge valves 38, 39 are opened and closed in every predetermined cycle according to duty ratios respectively set therefor.

At this time, the first purge valve 38 is controlled to start opening from the start of the predetermined cycle according to the duty ratio set for the first purge valve 38 (set in a range of 0 to 1). For example, the first purge valve 38 is opened from the start of the predetermined cycle to the elapse of half the predetermined cycle if the set duty ratio is 0.5 and is opened from the start to the end of the predetermined cycle if the set duty ratio is 1.

On the other hand, the second purge valve 39 is controlled to be closed at the end of the predetermined cycle according to the duty ratio set for the second purge valve 39 (set in a range of 0 to 1). For example, the second purge valve 39 is opened when half the predetermined cycle elapses and closed at the end of the predetermined cycle if the set duty ratio is 0.5 and is opened from the start to the end of the predetermined cycle if the set duty ratio is 1.

Depending on the duty ratios respectively set for the first and second purge valves 38, 39, both are simultaneously open.

In the present embodiment, the duty ratio for each of the first and second purge valves 38, 39 is set as follows.

First, a permeation amount of nitrogen having permeated to the anode electrode side is calculated based on the cathode pressure and the stack temperature and a nitrogen discharge request duty ratio is calculated based on this permeation amount of nitrogen. The permeation amount of nitrogen increases as the cathode pressure increases and as the stack temperature increases. The nitrogen discharge request duty ratio increases as the permeation amount of nitrogen increases.

Further, a moisture content on the anode electrode side (hereinafter, referred to as an "anode moisture content") is calculated according to the target output current and a moisture discharge request duty ratio is calculated based on this anode moisture content. The anode moisture content increases as the target output current increases. The moisture discharge request duty ratio increases as the anode moisture content increases.

The larger one of the nitrogen discharge request duty ratio and the moisture discharge request duty ratio is set as the duty ratio of the first purge valve 38 (first purge valve duty ratio) and the moisture discharge request duty ratio is set as the duty ratio of the second purge valve 39 (second purge valve duty ratio). In this way, impurities such as nitrogen and moisture permeating from the cathode electrode side to the anode electrode side are reliably discharged to the cathode gas discharge passage 22.

Here, the anode off-gas discharged to the cathode gas discharge passage 22 via the first and second purge valves 38, 39 is mixed with the cathode off-gas and discharged to outside air from the opening end of the cathode gas discharge passage 22.

The anode off-gas contains hydrogen not used in the electrode reaction beside nitrogen and moisture having permeated to the anode electrode side. Thus, a hydrogen concentration in mixture gas of the anode off-gas and the cathode off-gas (hereinafter, referred to as "exhaust gas") to be discharged to outside air needs to be reduced to below a combustible concentration.

Accordingly, in the present embodiment, a lower limit value of the compressor supply flow rate (=dilution request compressor supply flow rate to be described later) is set according to the purge flow rate so that the hydrogen concentration in the exhaust gas becomes below the combustible concentration.

Here, the purge flow rate depends on openings of the first and second purge valves 38, 39 (hereinafter, collectively referred to as a "purge valve opening") and differential pressures before and after the first and second purge valves 38, 39 (=differential pressure between the anode pressure and the atmospheric pressure) (hereinafter, collectively referred to as "differential pressure before and after the purge valves"). Thus, in the case of performing a pulsating operation of pulsating the anode pressure, the differential pressure before and after the purge valves pulsates and the purge flow rate pulsates (increases and decreases) as the anode pressure pulsates. Then, the lower limit value of the compressor supply flow rate set according to the purge flow rate pulsates and abnormal noise such as beat noise may be generated from the cathode compressor 24 when this lower limit value is set as a target value of the compressor supply flow rate.

Accordingly, in the present embodiment, the cathode compressor 24 is so controlled that abnormal noise such as beat noise is not generated from the cathode compressor 24 even if the lower limit value of the compressor supply flow rate is set according to the purge flow rate.

The cathode gas supply control according to the present embodiment is described with reference to FIGS. 5 to 9 below.

Figure 5:
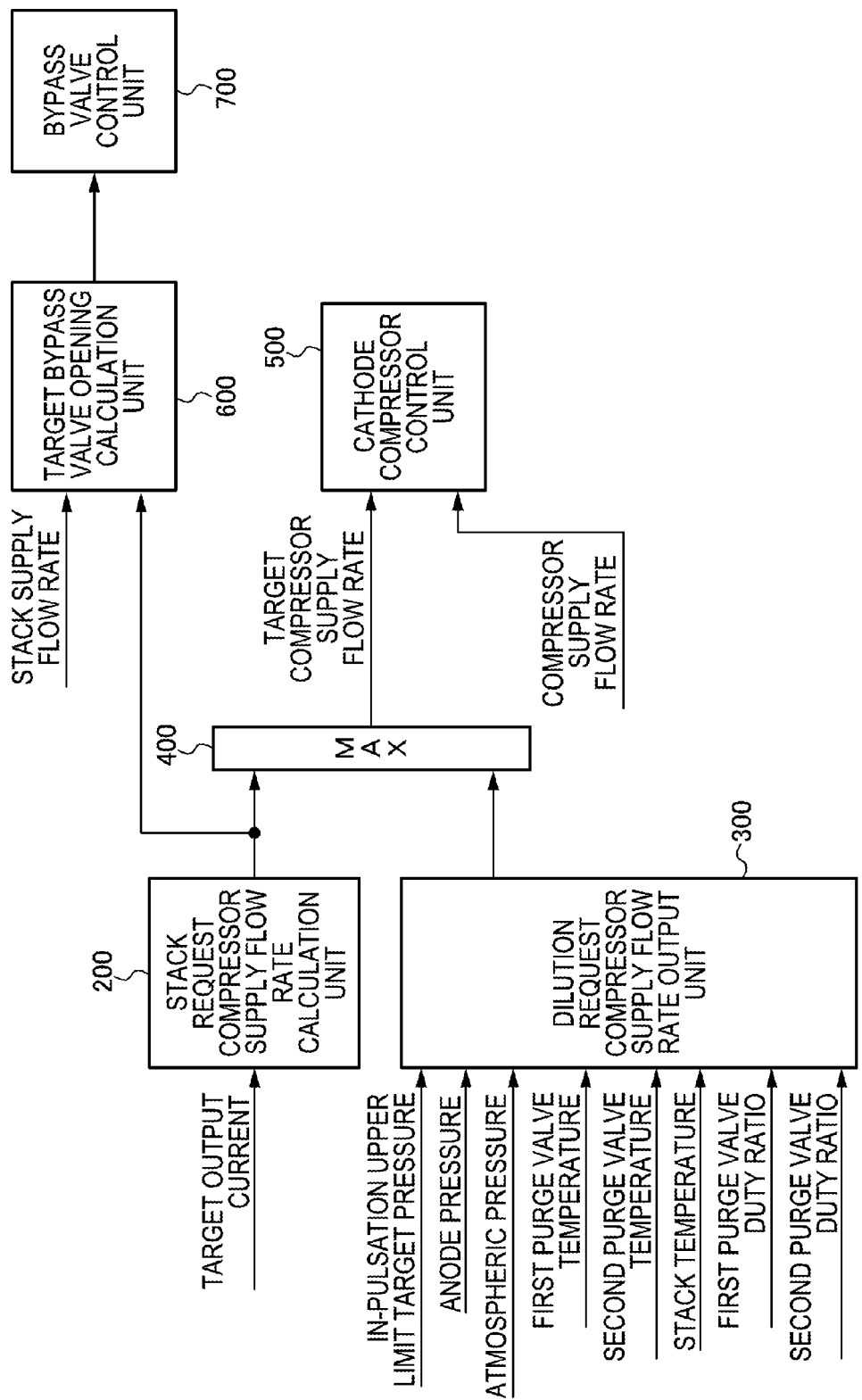
FIG. 5 is a chart showing the cathode gas supply control according to the one embodiment of the present invention.

FIG. 5 is a diagram showing the cathode gas supply control according to the present embodiment.

The target output current is input to a stack request compressor supply flow rate calculation unit 200. The stack request compressor supply flow rate calculation unit 200 calculates a stack request compressor supply flow rate (second target supply flow rate) based on the target output current. The stack request compressor supply flow rate is a target value of the stack supply flow rate necessary to ensure an oxygen partial pressure necessary for the electrode reaction in the cathode electrode of each fuel cell when the target output current is taken out from the fuel cell stack 1. The stack request compressor supply flow rate is larger when the target output current is large than when it is small.

The in-pulsation upper limit target pressure, the anode pressure, the atmospheric pressure, the first purge valve temperature, the second purge valve temperature, the stack temperature, the first purge valve duty ratio and the second purge valve duty ratio are input to a dilution request compressor supply flow rate output unit 300. The dilution request compressor supply flow rate output unit 300 outputs a dilution request compressor supply flow rate based on these input values. The dilution request compressor supply flow rate is a target value of the compressor supply flow rate necessary to reduce the hydrogen concentration of the exhaust gas to be discharged to the outside of the fuel cell system 100 to below the combustible concentration.

The dilution request compressor supply flow rate output unit 300 is described in detail with reference to FIG. 6.

Figure 6:
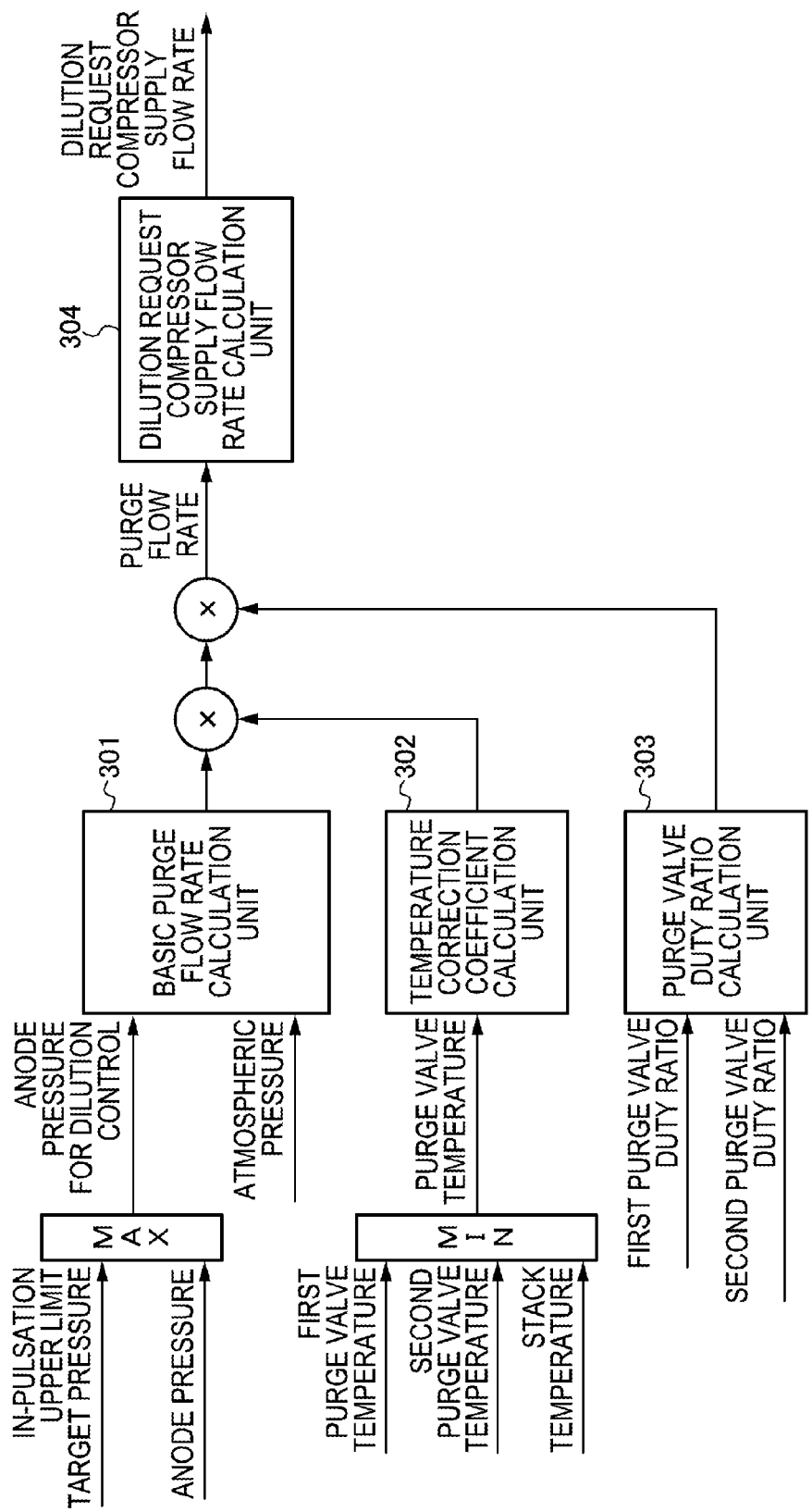
FIG. 6 is a chart showing a dilution request compressor supply flow rate output unit in detail.

As shown in FIG. 6, the dilution request compressor supply flow rate output unit 300 includes a basic purge flow rate calculation unit 301, a temperature correction coefficient calculation unit 302, a purge valve duty ratio calculation unit 303 and a dilution request compressor supply flow rate calculation unit 304.

The larger one of the in-pulsation upper limit target pressure and the anode pressure (hereinafter, referred to as an "anode pressure for dilution control") and the atmospheric pressure are input to the basic purge flow rate calculation unit 301. The basic purge flow rate is calculated with reference to a map of FIG. 7. As shown in the map of FIG. 7, the basic purge flow rate increases as the anode pressure for dilution control increases and the atmospheric pressure decreases, i.e. as the differential pressure before and after the purge valves increases.

Figure 7:
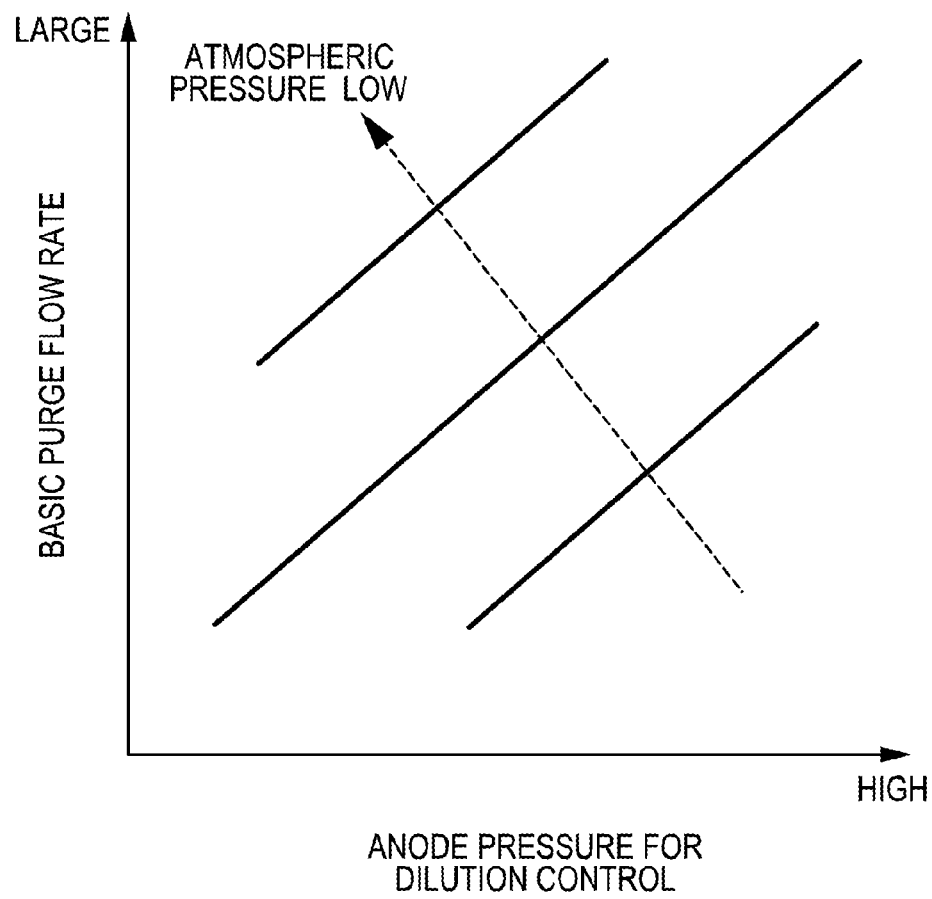
FIG. 7 is a map for calculating a basic purge flow rate based on an anode pressure for dilution control and an atmospheric pressure.

It should be noted that the map of FIG. 7 is a map showing the purge flow rate when the purge valve temperature is a predetermined reference temperature (e.g. 60° C.) and the sum of the first and second purge valve duty ratios (purge valve duty ratio) is 1.

Figure 8:
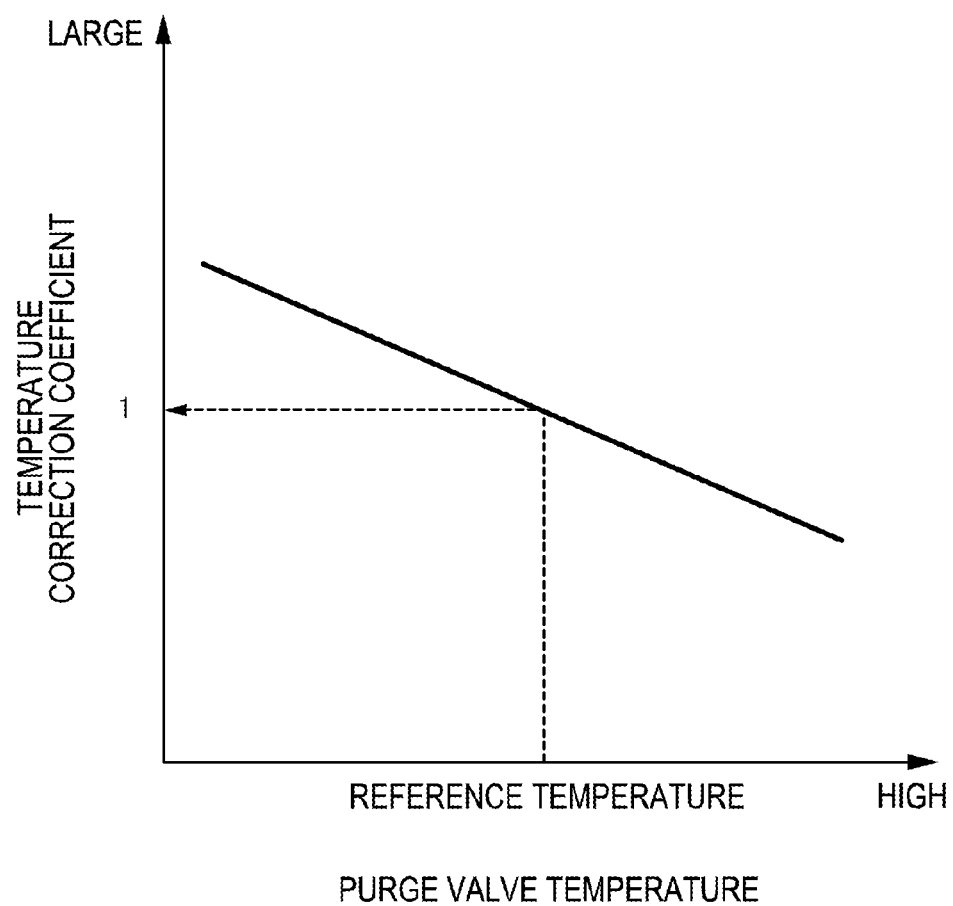
FIG. 8 is a table for calculating a temperature correction coefficient based on a purge valve temperature.

The lowest one of the first purge valve temperature, the second purge valve temperature and the stack temperature (hereinafter, referred to as a "purge valve temperature") is input to the temperature correction coefficient calculation unit 302. The temperature correction coefficient calculation unit 302 refers to a table of FIG. 8 and calculates a temperature correction coefficient to be multiplied with the basic purge flow rate based on the purge valve temperature. As shown in the table of FIG. 8, the temperature correction coefficient is 1 when the purge valve temperature is the reference temperature. The temperature correction coefficient is set at a value larger than 1 when the purge valve temperature is lower than the reference temperature and set to a value smaller than 1 when the purge valve temperature is higher than the reference temperature.

The first and second purge valve duty ratios are input to the purge valve duty ratio calculation unit 303. The purge valve duty ratio calculation unit 303 calculates the sum of the first and second purge valve duty ratios (range from 0 to 2) as the purge valve duty ratio. As described above, the first purge valve duty ratio is the larger one of the nitrogen discharge request duty ratio and the moisture discharge request duty ratio and the second purge valve duty ratio is the moisture discharge request duty ratio. That is, this purge valve duty ratio corresponding to the purge valve opening changes according to an impurity concentration of an anode of the fuel cell stack 1 and is calculated based on the impurity concentration of the anode of the fuel cell stack 1.

Figure 9:
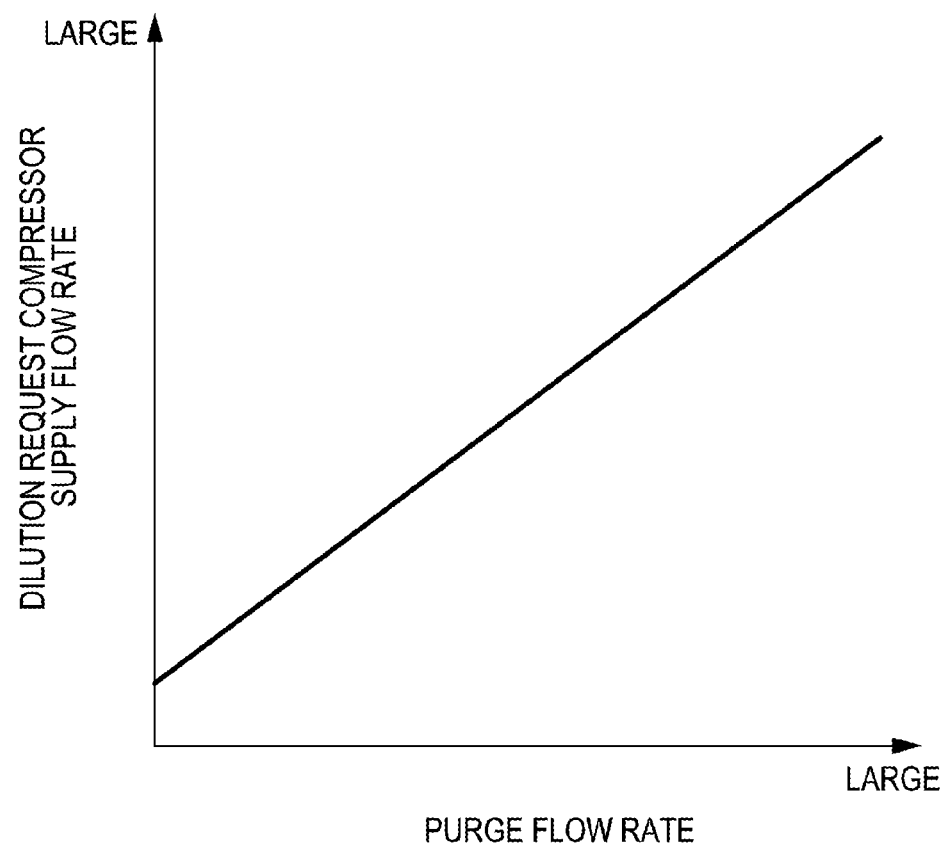
FIG. 9 is a table for calculating a dilution request compressor supply flow rate based on the purge flow rate.

The purge flow rate obtained by multiplying the basic purge flow rate by the temperature correction coefficient and the purge valve duty ratio is input to the dilution request compressor supply flow rate calculation unit 304. The dilution request compressor supply flow rate calculation unit 304 refers to a table of FIG. 9 and calculates the dilution request compressor supply flow rate (first target supply flow rate) based on the purge flow rate. As shown in the table of FIG. 9, the dilution request compressor supply flow rate increases as the purge flow rate increases. This is because the amount of hydrogen discharged to the cathode gas discharge passage 22 increases as the purge flow rate increases.

Referring back to FIG. 5 again, the cathode gas supply control according to the present embodiment is described.

The stack request compressor supply flow rate and the dilution request compressor supply flow rate are input to the target compressor supply flow rate calculation unit 400. The target compressor supply flow rate calculation unit 400 calculates the larger one of these two input values as a target compressor supply flow rate.

The compressor supply flow rate and the target compressor supply flow rate are input to the cathode compressor control unit 500. The cathode compressor control unit 500 calculates a torque command value for the cathode compressor 24 based on a deviation between the compressor supply flow rate and the target compressor supply flow rate and controls the cathode compressor 24 according to this torque command value. In this way, the compressor supply flow rate is controlled to the target compressor supply flow rate.

The stack supply flow rate and a target stack supply flow rate are input to a target bypass valve opening calculation unit 600. The target bypass valve opening calculation unit 600 calculates an opening of the bypass valve 27 for controlling the stack supply flow rate to the target stack supply flow rate as a target bypass valve opening based on a deviation between the stack supply flow rate and the target stack supply flow rate.

When the stack request compressor supply flow rate is set as the target compressor supply flow rate, the cathode compressor 24 is so controlled that the compressor supply flow rate reaches the stack request compressor supply flow rate. Thus, the cathode gas ejected from the cathode compressor 24 needs not be bypassed, wherefore the target bypass valve opening is set to be fully closed.

On the other hand, when the dilution request compressor supply flow rate is set as the target compressor supply flow rate to dilute hydrogen discharged to the cathode gas discharge passage 22, the compressor supply flow rate is larger than the stack request compressor supply flow rate. Thus, the target bypass valve opening is so set that the surplus (dilution request compressor supply flow rate−stack request compressor supply flow rate) flows into the bypass valve 26.

A target bypass opening is input to a bypass valve control unit 700. The bypass valve control unit 700 controls the opening of the bypass valve 27 to the target bypass valve opening.

Figure 10:
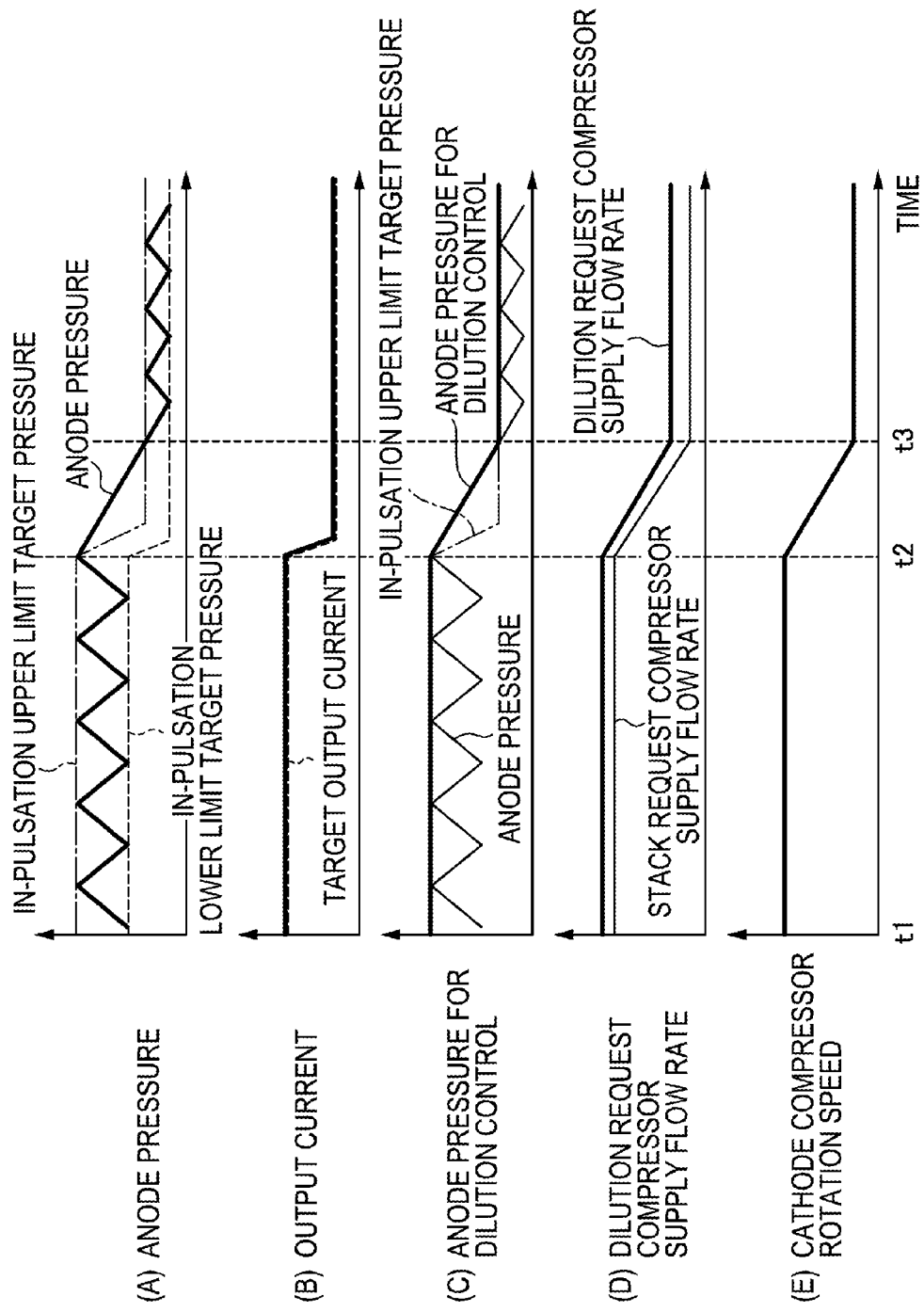
FIG. 10 is a time chart showing the operations of the anode gas supply control and the cathode gas supply control according to the one embodiment of the present invention.

FIG. 10 is a time chart showing the operations of the anode gas supply control and the cathode gas supply control according to the present embodiment.

First, the operation of the anode gas supply control is described.

In this time chart, the pulsating operation of pulsating the anode pressure between the in-pulsation upper limit target pressure and the in-pulsation lower limit target pressure calculated based on the target output current is already performed at time t1 (FIG. 10(A)). Since the target output current is constant during an interval from time t1 to time t2 (FIG. 10(B)), the pulsating operation of pulsating the anode pressure between the in-pulsation upper limit target pressure and the in-pulsation lower limit target pressure at time t1 continues to be performed (FIG. 10(A)).

When the target output current decreases, for example, due to a reduction in the accelerator operation amount at time t2 (FIG. 10(B)), the in-pulsation upper limit target pressure and the in-pulsation lower limit target pressure also respectively decrease according to a reduction of the target output current (FIG. 10(A)).

In this way, the opening of the anode pressure regulating valve 33 is fully closed to control the anode pressure to the reduced in-pulsation lower limit target pressure, and the supply of the anode gas from the high-pressure tank 31 to the fuel cell stack 1 is stopped. As a result, the anode gas in the fuel cell stack 1 is gradually consumed by power generation and the anode pressure decreases (FIG. 10(A)). As just described, a decreasing rate of the anode pressure during a down transition in which the target output current decreases depends on a consumption rate of the anode gas by power generation, wherefore the anode pressure may temporarily become higher than the in-pulsation upper limit target pressure during the down transition (FIG. 10(A)).

Next, the operation of the cathode gas supply control is described.

Since the in-pulsation upper limit target pressure is higher than the anode pressure from time t1 to time t2 at which the target output current decreases, the in-pulsation upper limit target pressure is set as the anode pressure for dilution control.

Since the in-pulsation upper limit target pressure is fixed at a predetermined value corresponding to the target output current unless the target output current fluctuates, the anode pressure for dilution control is also fixed at a predetermined value during the interval from time t1 to time t2.

In the present embodiment, the basic purge flow rate is calculated according to the anode pressure for dilution control fixed at this predetermined value and the flow rate obtained by multiplying the basic purge flow rate by the temperature correction coefficient and the purge valve duty ratio (purge valve opening) is calculated as the purge flow rate. Thus, even in the case of performing the pulsating operation of the pulsating the anode pressure, the purge flow rate is not calculated according to this pulsating anode pressure. Thus, the purge flow rate does not pulsate. Therefore, the dilution request compressor supply flow rate calculated based on the purge flow rate is also fixed at a predetermined value without pulsating (FIG. 10(D)).

In this way, the dilution request compressor supply flow rate is set as the target compressor supply flow rate and a rotation speed of the cathode compressor 24 can be maintained constant even if the cathode compressor 24 is so controlled that the compressor supply flow rate reaches the dilution request compressor supply flow rate (FIG. 10(E)).

Accordingly, it is possible to suppress the generation of abnormal noise such as beat sound from the cathode compressor 24 and suppress the deterioration of sound vibration performance of the fuel cell system 100.

Further, in the present embodiment, the anode pressure is set as the anode pressure for dilution control if the target output current decreases at time t2 and the anode pressure temporarily becomes higher than the in-pulsation upper limit target pressure (FIG. 10(A)).

As just described, while the anode pressure is reduced toward the in-pulsation lower limit target pressure set based on the reduced target output current, the anode pressure does not pulsate even if the purge flow rate is calculated by setting the anode pressure as the anode pressure for dilution control. Thus, the purge flow rate does not pulsate. Therefore, abnormal noise such as beat noise is not generated from the cathode compressor 24 even if the anode pressure is set as the anode pressure for dilution control.

Further, if the anode pressure becomes higher than the in-pulsation upper limit target pressure, the hydrogen concentration in the exhaust gas can be sufficiently reduced by calculating the purge flow rate with the anode pressure set as the anode pressure for dilution control.

When the in-pulsation upper limit target pressure becomes higher than the anode pressure at time t3, the in-pulsation upper limit target pressure is set as the anode pressure for dilution control again and a control similar to that after time t1 is executed.

According to the present embodiment described above, the fuel cell system 100 includes the cathode compressor 24 for supplying the cathode gas to the fuel cell stack 1, the anode gas discharge system (first and second purge passages 36, 37 and first and second purge valves 38, 39) for discharging the anode off-gas discharged from the fuel cell stack 1 into the cathode gas flow passage composed of the cathode gas supply passage 21 and the cathode gas discharge passage 22 and the controller 140.

The controller 140 includes a pulsating operation control unit for causing the pressure of the anode gas to pulsate based on the operating state of the fuel cell stack 1, a purge control unit for purging the anode off-gas into the cathode gas flow passage based on the concentration of impurities such as nitrogen and moisture of the anode of the fuel cell stack 1 and the pressure of the anode, and a compressor control unit for controlling the cathode compressor 24 based on the purge flow rate controlled by the purge control unit. The purge control unit of the controller 140 sets a predetermined value determined according to the pulsating state of the anode gas as the pressure of the anode.

Since the fuel cell system 100 is configured as described above, a control target value (dilution request compressor supply flow rate) for controlling the cathode compressor 24 is calculated based on the purge flow rate of the anode off-gas discharged into the cathode gas in the present embodiment. However, even in the case of controlling the compressor based on the purge flow rate to reduce the hydrogen concentration of the exhaust gas to or below the predetermined concentration, the purge flow rate is calculated not based on the pulsating actual pressure of the anode gas, but based on the predetermined value determined according to the pulsating state of the anode gas. Thus, the cathode gas supply flow rate of the cathode compressor 24 controlled based on the purge flow rate does not pulsate, wherefore the generation of abnormal noise such as beat noise from the cathode compressor 24 can be suppressed.

Further, according to the present embodiment, the in-pulsation upper limit target pressure (upper limit target pressure when the pressure of the anode gas is caused to pulsate) is used as the predetermined value determined according to the pulsating state of the anode gas. Since it can be suppressed in this way that the calculated purge flow rate becomes smaller than the actual purge flow rate, the hydrogen concentration in the exhaust gas can be sufficiently reduced by controlling the cathode compressor 24 to reach the dilution request compressor supply flow rate calculated based on the purge flow rate.

Further, according to the present embodiment, the purge control unit is configured to control the purge flow rate using the actual pressure of the anode gas as the pressure of the anode instead of the in-pulsation upper limit target pressure when the actual pressure of the anode gas becomes higher than the in-pulsation upper limit target pressure, considering that the anode pressure temporarily becomes higher than the in-pulsation upper limit target pressure during the down transition. Specifically, the purge flow rate is calculated according to the purge valve opening and the anode pressure.

Since it can be suppressed in this way that the calculated purge flow rate becomes smaller than the actual purge flow rate, the hydrogen concentration in the exhaust gas can be sufficiently reduced even in such an operating state where the anode pressure becomes higher than the in-pulsation upper limit target pressure as during the down transition.

Further, since the purge valve opening changes according to the present embodiment, the purge flow rate is calculated according to the purge valve duty ratio in each predetermined cycle corresponding to the purge valve opening and the in-pulsation upper limit target pressure determined according to the pulsating state of the anode gas.

As described above, the purge flow rate depends on the purge valve opening and the differential pressure before and after the purge valves. Since the differential pressure before and after the purge valves is a differential pressure between the anode pressure and the atmospheric pressure and the atmospheric pressure does not fluctuate in a short time, the differential pressure before and after the purge valves basically fluctuates according to the anode pressure.

Thus, even if the pulsating operation of pulsating the anode pressure is performed by calculating the purge flow rate using the differential pressure between the predetermined value determined according to the pulsating state of the anode gas and the atmospheric pressure as the differential pressure before and after the purge valves as in the present embodiment, the purge flow rate does not affect the differential pressure before and after the purge valves and the differential pressure before and after the purge valves does not pulsate.

Thus, the purge flow rate does not pulsate, wherefore the dilution request compressor supply flow rate calculated based on the purge flow rate also does not pulsate.

Accordingly, even in the case of performing the pulsating operation of pulsating the anode pressure and controlling the cathode compressor 24 based on the purge flow rate to reduce the hydrogen concentration in the exhaust gas to below the combustible concentration, the dilution request compressor supply flow rate calculated based on the purge flow rate does not pulsate, wherefore the generation of abnormal noise such as beat noise from the cathode compressor 24 can be suppressed.

Although the embodiment of the present invention has been described above, the above embodiment is merely an illustration of one application example of the present invention and not of the nature to limit the technical scope of the present invention to the specific configuration of the above embodiment.

For example, although the in-pulsation upper limit target pressure is used as the predetermined value determined according to the pulsating state of the anode gas in the above embodiment, an average value (average pressure) of the in-pulsation upper limit target pressure and the in-pulsation lower limit target pressure may be used. Since an error between the calculated purge flow rate and the actual purge flow rate can be reduced by doing so, a useless increase of the dilution request compressor supply flow rate can be suppressed. As a result, the power consumption of the cathode compressor 24 can be suppressed, wherefore fuel economy can be improved.

Further, the in-pulsation lower limit target pressure may be used as the predetermined value determined according to the pulsating state of the anode gas. Since the pulsation of the purge flow rate can be suppressed also by this, the generation of abnormal noise such as beat noise from the cathode compressor 24 can be suppressed. It should be noted that, in this case, it may be prevented that the calculated purge flow rate becomes smaller than the actual purge flow rate by setting appropriate values as map values of FIG. 7.

Further, although the fuel cell system 100 with two purge valves (first purge valve 38 and second purge valve 39) is described as an example in the above embodiment, one purge valve may be provided or three or more purge valves may be provided.

Further, although the purge valve duty ratio is used as the purge valve opening in the above embodiment, there is no limitation to this and the purge valve opening may be specified such as from an actual purge valve opening and a valve opening time.

Further, although the purge flow rate is calculated according to the purge valve opening and the predetermined value determined according to the pulsating state of the anode gas in the above embodiment, the purge flow rate may be calculated based on the predetermined value determined according to the pulsating state of the anode gas if the purge valve opening of the fuel cell system is constant.

Further, although the first and second purge passages 36, 37 are connected to the cathode gas discharge passage 22 in the above embodiment, they may be connected to the cathode gas supply passage 21 or to the bypass passage 26 as described above.

Further, the buffer tank 40 as a space for storing the anode off-gas is provided in each of the above embodiments. However, an internal manifold of the fuel cell stack 1 may be, for example, used as a space alternative to the buffer tank 40 without providing such a buffer tank 40. It should be noted that the internal manifold mentioned here is a space inside the fuel cell stack 1 where the anode off-gas having flowed through the anode gas flow passage of each separator is collected, and the anode gas is discharged to the first and second anode gas discharge passages 34, 35 via the manifold. It should be noted that one anode gas discharge passage may be provided instead of two anode gas discharge passages.

The present application claims a priority of Japanese Patent Application No. 2013-167264 filed with the Japan Patent Office on Aug. 12, 2013, and all the contents of which are hereby incorporated by reference.

The invention claimed is:

1. A fuel cell system for generating power by supplying anode gas and cathode gas to a fuel cell, comprising:
a compressor for supplying the cathode gas to the fuel cell;
an anode gas discharge system for discharging anode off-gas discharged from the fuel cell into a cathode gas flow passage;
a programmable pulsating operation control unit programmed to cause a pressure of the anode gas to pulsate based on an operating state of the fuel cell;
a programmable purge control unit programmed to purge the anode off-gas into the cathode gas flow passage based on an impurity concentration of an anode of the fuel cell and calculating a purge flow rate based on the impurity concentration of the anode of the fuel cell and a pressure of the anode; and
a programmable compressor control unit programmed to control the compressor based on the purge flow rate calculated by the programmable purge control unit,
wherein the programmable purge control unit is further programmed to set the pressure of the anode to a predetermined value determined according to a pulsating state of the anode gas to suppress beat noise of the compressor due to the pulsation of the anode gas.

2. The fuel cell system according to claim 1, wherein the predetermined value is an upper limit target pressure when the pressure of the anode gas is caused to pulsate.

3. The fuel cell system according to claim 1, wherein the predetermined value is a lower limit target pressure when the pressure of the anode gas is caused to pulsate.

4. The fuel cell system according to claim 1, wherein the predetermined value is an average pressure between an upper limit target pressure and a lower limit target pressure when the pressure of the anode gas is caused to pulsate.

5. The fuel cell system according to claim 1, wherein the programmable purge control unit is further programmed to set the pressure of the anode to an actual pressure of the anode gas instead of the predetermined value when the actual pressure of the anode gas becomes higher than the predetermined value.

6. The fuel cell system according to claim 1, wherein the programmable pulsating operation control unit is further programmed to calculate an upper limit target pressure and a lower limit target pressure when the pressure of the anode gas is caused to pulsate based on a load of the fuel cell, and set the upper and lower limit target pressures higher when the load of the fuel cell is higher than when the load of the fuel cell is low.

7. The fuel cell system according to claim 1, further comprising:
a first target supply flow rate calculation unit configured to calculate a first target supply flow rate of the compressor based on the purge flow rate; and
a second target supply flow rate calculation unit configured to calculate a second target supply flow rate of the compressor based on a load of the fuel cell,
wherein the programmable compressor control unit is further programmed to control the compressor based on a larger one of the first and second target supply flow rates.

8. The fuel cell system according to claim 1, wherein:
the anode gas discharge system includes a purge valve for regulating a flow rate of the anode off-gas discharged into the cathode gas flow passage;
the programmable purge control unit is further programmed to calculate an opening of the purge valve based on the impurity concentration of the anode of the fuel cell, and purges the anode off gas into the cathode gas flow passage based on the opening of the purge valve and the pressure of the anode.

9. A control method for a fuel cell system which is provided with a fuel cell supplied with anode gas and cathode gas, a compressor for supplying the cathode gas to the fuel cell, and an anode gas discharge system for discharging anode off-gas discharged from the fuel cell into a cathode gas flow passage, comprising:
- a pulsating operation control step of causing a pressure of the anode gas to pulsate based on an operating state of the fuel cell;
- a purge control step of purging the anode off-gas into the cathode gas flow passage based on an impurity concentration of an anode of the fuel cell and calculating a purge flow rate based on the impurity concentration of the anode of the fuel cell and a pressure of the anode;
- a compressor control step of controlling the compressor based on the purge flow rate calculated by the purge control step; and
- a step of setting the pressure of the anode to a predetermined value determined according to a pulsating state of the anode gas in the purge control step to suppress beat noise of the compressor due to the pulsation of the anode gas.

* * * * *